(12) United States Patent
Wymore

(10) Patent No.: US 10,427,587 B2
(45) Date of Patent: Oct. 1, 2019

(54) FRONT LIGHT BAR ASSEMBLY FOR VEHICLE

(71) Applicant: Iddea California, LLC, Brea, CA (US)

(72) Inventor: Timothy J. Wymore, Brea, CA (US)

(73) Assignee: NAADE, Inc., Laredo, TX (US)

( * ) Notice: Subject to any disclaimer, the term of this patent is extended or adjusted under 35 U.S.C. 154(b) by 0 days.

(21) Appl. No.: 15/795,518

(22) Filed: Oct. 27, 2017

(65) Prior Publication Data

US 2019/0126809 A1 May 2, 2019

(51) Int. Cl.
| | |
|---|---|
| *B60Q 1/04* | (2006.01) |
| *B60R 19/52* | (2006.01) |
| *B60Q 1/00* | (2006.01) |
| *B60Q 1/26* | (2006.01) |
| *F21S 4/28* | (2016.01) |
| *F21Y 103/10* | (2016.01) |

(52) U.S. Cl.
CPC ......... *B60Q 1/0483* (2013.01); *B60Q 1/0035* (2013.01); *B60Q 1/2696* (2013.01); *B60R 19/52* (2013.01); *F21S 4/28* (2016.01); *F21Y 2103/10* (2016.08)

(58) Field of Classification Search
CPC .. B60Q 1/0035; B60Q 1/0483; B60Q 1/2696; F21W 2103/10
See application file for complete search history.

(56) References Cited

U.S. PATENT DOCUMENTS

| | | | |
|---|---|---|---|
| 5,695,228 A | 12/1997 | Storer | |
| 6,612,595 B1 | 9/2003 | Storer | |
| D572,180 S | 7/2008 | Storer | |
| D577,319 S | 9/2008 | Storer | |
| 7,703,834 B1* | 4/2010 | Hardy | B60R 9/06 296/102 |
| D636,305 S | 4/2011 | Alvarez | |
| 8,585,107 B2* | 11/2013 | Kekich, Jr. | B60R 19/52 293/115 |
| D757,316 S | 5/2016 | Wymore | |
| 9,840,218 B1 | 12/2017 | Wymore | |
| 2011/0006553 A1* | 1/2011 | Fretz | B60R 19/48 293/115 |
| 2013/0329413 A1* | 12/2013 | Cotta, Sr. | B60Q 1/0483 362/220 |

(Continued)

*Primary Examiner* — Zheng Song
(74) *Attorney, Agent, or Firm* — Stetina Brunda Garred and Brucker

(57) ABSTRACT

A front light bar assembly is provided to fasten to the vehicle so the assembly is in front of the grill and above the front bumper. The assembly has a main frame with a front tubular member and a mounting plate permanently fastened to and above that front member. The mounting plate has a plurality of fastener holes. Two vehicle mounting members connect the main frame and extend rearwardly to connect to the motor vehicle and position the main frame above the front bumper and in front of the front grill. A light box is releasably fastened below the main frame. A front panel of the light box has an elongated opening with a mounting bracket on each opposing end of the opening to hold a light bar. A decorative panel may cover the opening. A top cover plate may cover the fastener openings. Lights may be optionally connected to the mounting plate, below an over rider bar also optionally connected to the main frame.

14 Claims, 10 Drawing Sheets

(56) References Cited

U.S. PATENT DOCUMENTS

2015/0021937 A1* 1/2015 Perez .................. B60Q 1/0005
            293/115
2017/0088076 A1* 3/2017 Fujimoto ................ B60R 19/44
2017/0334347 A1* 11/2017 Wilkins ................ F21S 43/237

* cited by examiner

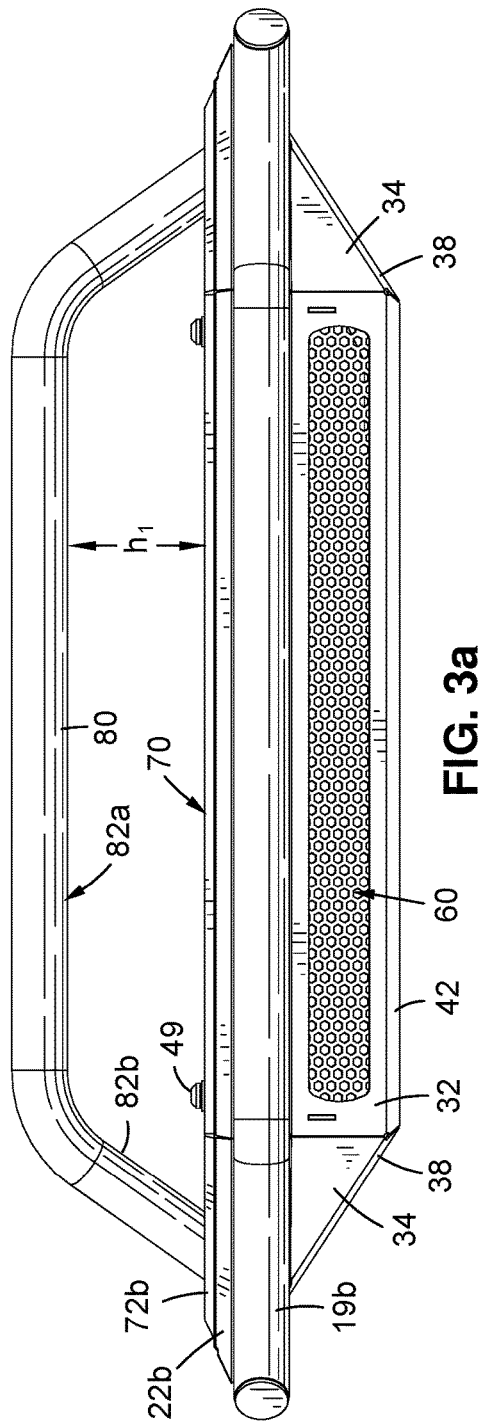
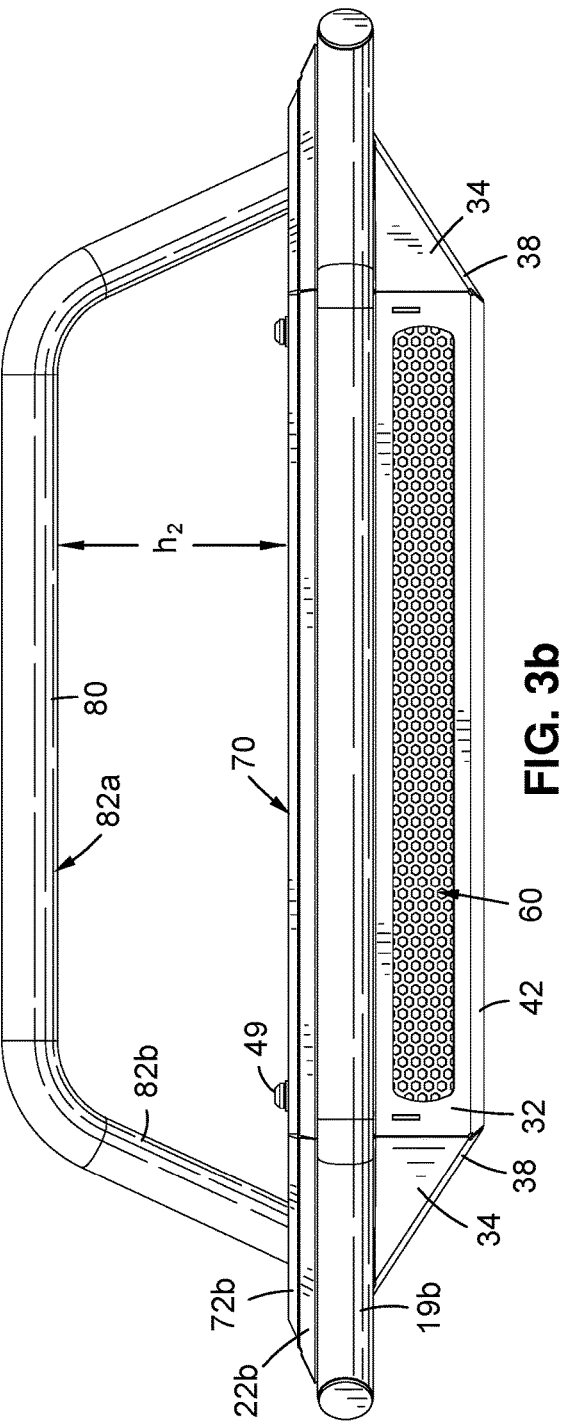

FRONT LIGHT BAR ASSEMBLY FOR VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

Even with improved quartz lights and iodized lights for motor vehicles, there are many situations where additional lighting is desirable. Off-road vehicles operated at night find additional lighting very useful. The need for additional lighting may be met by fastening lights to a bracket above the bed of a truck so the lights shine over the top of the truck's cab to illuminate the area in front of the truck. But lights above the cab are high in elevation relative to the driver and the truck cab and/or hood block much of the light from illuminating the ground immediately in front of the truck. There is thus a need for a motor vehicle light bar that provides improved illumination.

Many light bars have the lights permanently fixed to mounting brackets at the factory. While this preassembly may make installation easier it makes it difficult to vary the number, style and location of the lights or to vary the amount and location of the resulting illumination. This pre-fixed lighting also requires making several different light bars to meet the lighting desired by different users. As the light size affects the height of the over-rider bar, a number of different, prefabricated light bars are needed to meet the various user demands. Even if the lights are removably fixed to the mounting brackets there is a need to stock a large number of different light bars to avoid the unsightly appearance of empty holes for light brackets, and to have the appropriate height of over rider bar on the light bar. There is thus a need for an improved apparatus to allow the use of different light sizes, light locations, light types and to allow different over rider bars, while providing an aesthetic appearance.

When lights are placed on the exterior of a vehicle they are subject to impact damage from trees, shrubs, rocks, flying debris and various other objects. There is thus a need for protecting the lights on exterior light bars from damage. There is a further need to address the above needs and improvements with aesthetically pleasing configurations to support the lights and connect them to the motor vehicle in various configurations without stocking a large inventory of prefabricated light bar assemblies.

BRIEF SUMMARY

A front light bar assembly is provided for the front of a motor vehicle having a front bumper and front grill. The assembly may include a main frame having a front tubular member and a mounting plate permanently fastened to an upper portion of the front tubular member. The front tubular member preferably extends across a majority of a width of the front grill and has two opposing ends each inclined toward a rear of the vehicle. The mounting plate may have a plurality of fastener holes extending therethrough. The assembly also includes two vehicle mounting members connected to the main frame and having a rearward end configured to releasably connect to the motor vehicle. Each vehicle mounting member extends in a rearward direction a distance sufficient to connect to the motor vehicle and position the main frame above the front bumper and in front of the front grill. The assembly may also include a light box releasably fastened to and extending below the main frame but preferably above the front bumper. The light box has a front panel with an elongated opening over 12 inches long and over one inch high and further has a mounting bracket on each opposing end of the elongated opening for mounting one end of a light bar. The light box may have a height short enough that the front panel fits between the main frame and the front bumper.

In further variations, the light box may include two opposing end panels connected to the front panel and extending in a downward and rearward direction, with bottom edges on the end panels that incline upward toward a bottom of the main frame. The light box may also be connected to the bottom of the mounting plate by four bolts on each side of the mounting plate, with two of those four bolts connecting one of the mounting brackets to the mounting plate, and the remaining two of those four bolts connecting one of the end panels to the mounting plate. Further, the elongated opening may have a decorative panel covering the opening and removably connected to the light box. The decorative panel may include an open mesh. Further, a light bar may be connected to the mounting brackets of the light box and aligned with the elongated opening to shine through that elongated opening during use.

In still further variations, the apparatus may include an over rider bar removably connected to the main frame and having a middle portion vertically above the main frame a distance h. The over rider bar may have two opposing end portions of the same length that extend downward to connect to the main frame. A plurality of lights may be releasably connected to the main frame and preferably to the mounting plate. The distance h may be between about 4 to about 6 inches, to accommodate the connection of one or more three inch lights to the main frame, using the plurality of fastener holes in the mounting plate. The distance h may be between about 7 to about 10 inches, to accommodate the connection of one or more six inch lights to the main frame. The distance h may also be between about 3 inches to 6 inches with a single light bar connected to the mounting plate using a plurality of the fastener holes in the mounting plate.

In further variations of the above embodiments, each end portion of the over rider bar may be removably connected to the mounting plate by a threaded fastener passing through one of the plurality of holes in the mounting plate. The assembly may also include a top cover plate releasably connected to the main frame and covering the fasteners holes in the mounting plate. An over rider bar may be connected to the top cover plate and to the mounting plate, but preferably no lights as the cover plate covers the fastener holes for the lights.

In still further variations of the above embodiments, the mounting plate may have an inclined side along at least a front periphery of the mounting plate, with the side inclined forward and downward and fastened to a top portion of the front tubular member so the mounting plate is located above the top of the front tubular member.

BRIEF DESCRIPTION OF THE DRAWINGS

These and other advantages and features of the invention may be better appreciated in view of the following drawings and descriptions in which like numbers refer to like parts throughout, and in which:

FIG. 3a is a front view of the light bar assembly of FIG. 2 having a low height rider bar having a first height above the top cover plate;

FIG. 3b is a front view of the light bar assembly of FIG. 2 having a high height rider bar having a second height above the top cover plate which second height is greater than the first height;

FIG. 5a is a rear perspective view of the light bar assembly of FIG. 3a;

DETAILED DESCRIPTION

Referring primarily to FIGS. 1-4, a light bar assembly 10 is shown that may have various components to easily accommodate different lighting arrangements. As used herein the relative terms above, below, top, bottom, front and back, forward and rearward, refer to the relative directions of a motor vehicle to which the light bar 10 is attached, with front being in the direction the driver faces behind the steering wheel, and down being the direction toward the ground.

Figure 1:
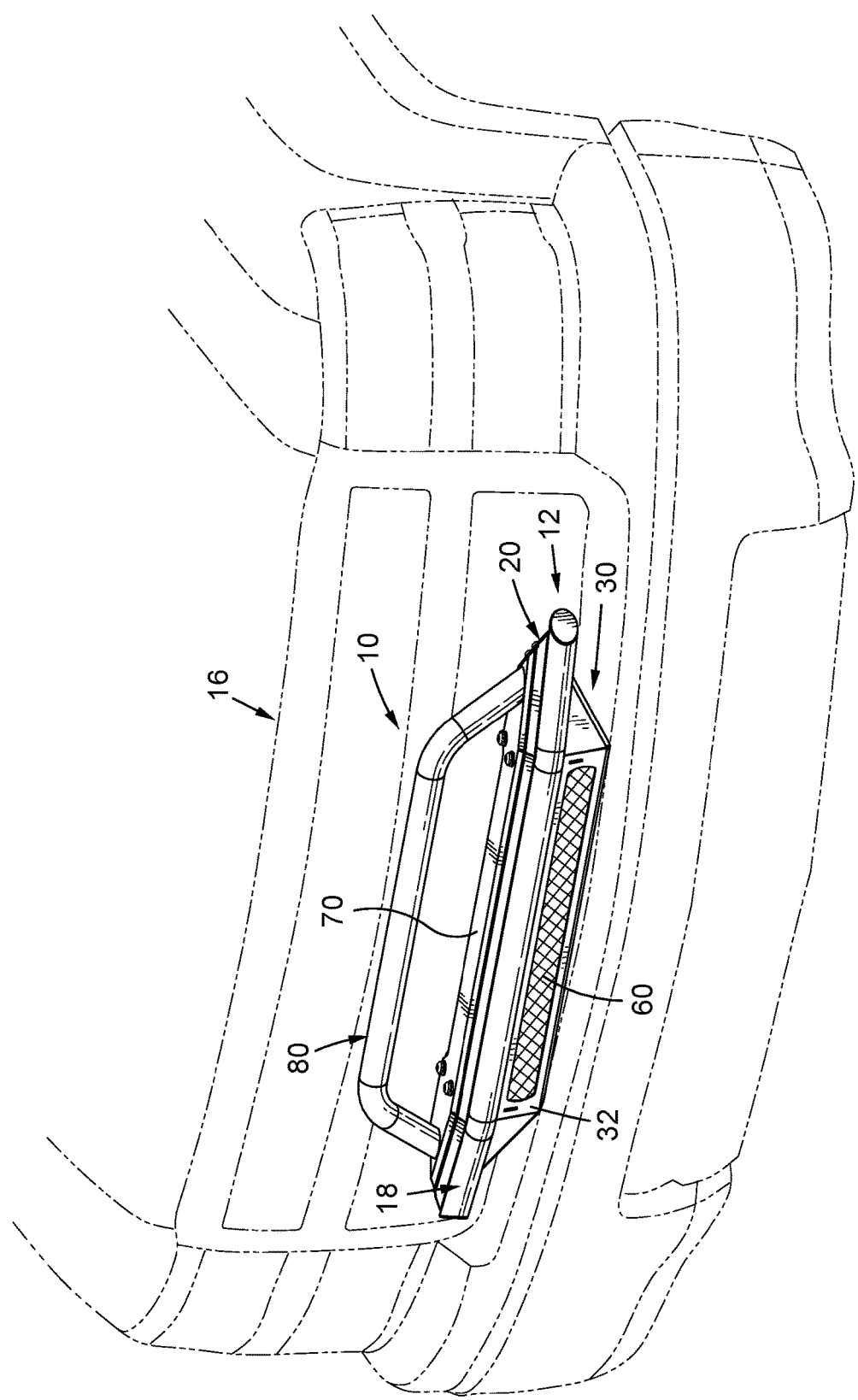
FIG. 1 is a front perspective view of a front light bar assembly on the front end of a motor vehicle which is shown in phantom.

A main frame 12 has vehicle mounting members 14 located and configured to preferably fasten to the front of a motor vehicle behind the front grill and to position the main frame in front of the front grill and above the front bumper. The vehicle mounting members 14 are shown as vertically oriented flanges with bolt holes located to mate with corresponding holes on brackets connected to the frame and/or body of motor vehicle 16 (FIG. 1). Depending on the grill, the shape and orientation of the vehicle mounting members 14 may vary as it is desirable to configure the vehicle mounting members to fit between any prominent grill members without altering the front grill. The bracket may have cross-sectional shapes other than rectangular, or it may have a rectangular shape that is twisted from vertical to horizontal (or vice versa) to pass through the grill and fasten to the vehicle.

The main frame 12 preferably has a tubular front member 18 that extends across a majority of the width of the front grill of the motor vehicle, with a mounting plate 20 connected along at least a majority of the length of the front member 18, preferably by welding the mounting plate 20 at or adjacent the top of the front member 18. The front member 18 is preferably a metal tube with an outer diameter of about 1.5 to 3 inches in diameter or largest dimension if non-circular, tubular cross-sections are used. Cylindrical tubes are preferred for the front member 18. The ends of the front member 18 are preferably closed, more preferably closed at an angle so the end forms an ellipse in the vertical plane. But closures orthogonal to the axis of the tubular front member may be used, as may domed closures.

The mounting plate 20 may comprise a flat sheet of metal with one peripheral side connected to the front member 18. But preferably the mounting plate 20 has an inclined side 22 along at least a front periphery of the mounting plate, with the side inclined forward and downward and fastened to a top portion of the front tubular member so the mounting plate 20 is offset above or located above the top of the front member 18. Thus, depending on the shape of the mounting plate, the plate 20 has one or more inclined sides 22 that offset the mounting plate 20 above the front member 18. The upper surface of the mounting plate 20 is preferably generally flat. The depending sides 22 may be curved (convex or concave), or may be flat sides inclined at an angle. In the depicted embodiment, the bottom of the front side 22c on the front of the mounting plate 20 extends in a generally straight line and is welded to the top of the center portion 19a of the front member 18. The depending front sides 22b at the opposing ends of the mounting plate advantageously conform to the location of the rearwardly extending ends 19b of the front member 18 and are also connected to the ends 19, preferably by welding. The rear sides 19c, extend rearwardly and toward the center plane of the vehicle and in the depicted embodiment have circular cutouts 23 (FIG. 5a) in the abutting rear sides 22c to better fit against the cylindrical tube of the front member 18 at each end 19b. Advantageously, the bottom side of the mounting plate 20 connects to the vehicle mounting members 18. A bolted or welded connection is believed suitable. The back side of the mounting plate 20 may or may not have a depending side 22 on it, and is shown without a side on the edge of the plate locate toward the vehicle (FIG. 1). The depending sides 22 stiffen the mounting plate and are thus generally desirable.

Figure 4:
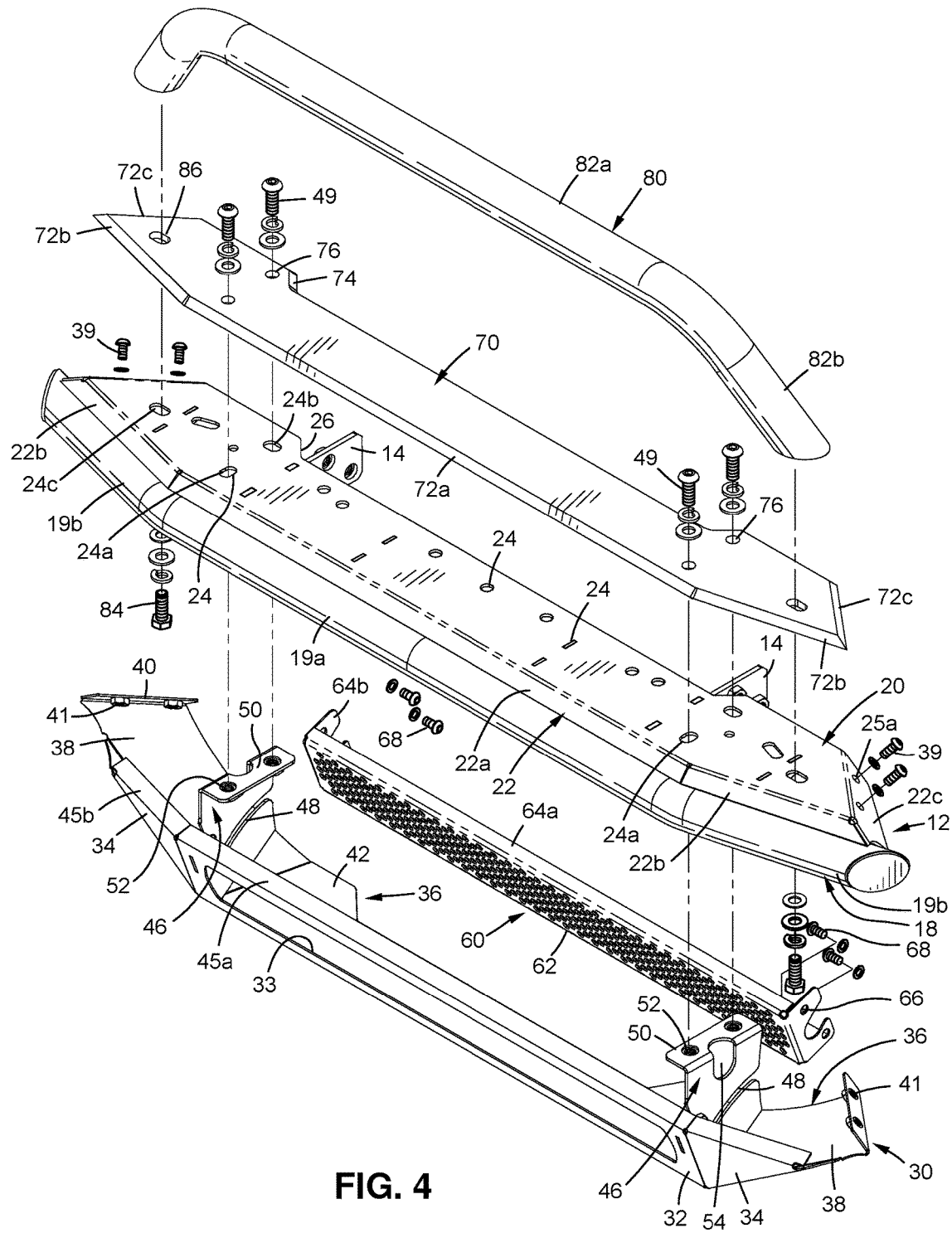
FIG. 4 is an exploded, front perspective view of the light bar assembly of FIG. 2.

As best seen in FIG. 4, the mounting plate 20 has a plurality of fastener holes 24 of various shapes extending through the plate. As explained later, the holes 24 allow various lights and parts to be removably fastened to the main frame 12.

As best seen in FIGS. 1 thorough 5b, the front member 18 has a generally straight and horizontal middle portion 19a, with a rearwardly inclined end portion 19b at each opposing end of the front member. The front member 18 and its ends is preferably in the same general plane as seen in FIGS. 3a, 3b.

The mounting plate 20 similarly has a generally straight middle portion, with rearwardly inclined, straight end portions that follow the ends of the front member 18. The two opposing ends of the mounting plate extend rearward toward the vehicle, and inward toward a vertical, center plane of the vehicle, with a rear edge of the mounting plate extending between the ends of the mounting plate.

The rear edge of the mounting plate 20 (opposite the straight portion of the front member 18) preferably tracks and is parallel to the straight shape of the front member 18. The rear edge of the mounting plate may extend from end to end to join the rearwardly and inwardly inclined ends of the mounting plate. But preferably the rear edge of the mounting plate is offset away from the vehicle and toward the front member 18 by offsets 26, to accommodate a curved grill or to ensure room between the plate 20 and the vehicle's grill to avoid contact and potential damage. Referring to FIG. 4, the mounting plate 20 may thus have a generally flat surface with a central portion having parallel front and back sides that extend along a majority of the length of the plate 20, with opposing, pointed ends that include a rear edge parallel to the front and back edges but offset from the back edge by offset 26.

A plurality of stiffeners 28 (FIG. 5b) are provided along the length of the center 19a of the front member. The stiffeners may take various shapes but preferably comprise flat plates with one end cut to conform to the shape of the front member 18 and with a top side abutting and connected to the lower surface of the mounting plate 20. If the front member 18 comprises a cylindrical tube the stiffener may have a concave end with a flat top, with both the top welded to the bottom of the mounting plate 20 and the concave end welded to or abutting the rear side of the front tube 18, preferably along the center 19a but possibly along the ends 19b. The stiffeners 28 help stiffen and support the plate 20 by interconnecting the plate 20 and front member 18.

Referring to FIGS. 1-5b, a light box 30 may be attached to the main frame 12 to extend below the main frame. The light box 30 is shown with a front panel 32 facing forward and defining an opening 33 in the front panel. The opening 33 is preferably an elongated opening with long (e.g., about 12-40 inch), straight, parallel opposing sides that are preferably spaced a few inches apart (e.g., about 1-4 inches, 1-2 preferred) and short outwardly-curved ends. The front panel 32 is preferably below the center portion 19a of the front member 18. Rearwardly inclined ends 34 of the front panel 32 incline in a rearward direction and preferably keep beneath the rearwardly inclined ends 19b of the front member 18. The front panel 32 and front panel ends 34 may be generally vertical downward, but they are preferably inclined rearward at an angle of about 15 to 45 degrees and more preferably at an angle of about 30 degrees. The bottom edge of each of the front panel ends 34 preferably also angle upwards towards the respective adjacent end 19b of the front member 18 and more preferably abut that respective, adjacent end 19b. The light box 30 may have a vertical height that is preferably short enough that the light box fits between the main frame 12 and the top of the front bumper of the motor vehicle (FIG. 1). The front panel 32 preferably has a vertical height that is short enough that the panel 32 fits between the main frame and the top of the front bumper.

The light box 30 preferably has a bottom 36 that includes an inclined bottom end portion 38 at each end of the light box, with each bottom end portion 38 connected to a different one of the ends 34, and below one of the ends of the mounting plate 20. At the upper end of each bottom end portion 38 is a connecting flange 40 extending generally perpendicular to the end portion 38 and configured to connect to the mounting portion 20. Preferably, each rear side 22c has holes 25a located to coincide with threaded holes 25b through the connecting flange 40 of the adjacent end portion 38, so threaded fasteners 39 can connect the flange 40 to the rear side 22c (FIGS. 5a-5b) as each bottom end portion 38 is connected to an end 34, the fasteners 38 connect the ends 34 and/or bottom end portions 38 to the main frame 12.

Still referring to FIGS. 1-5b, the bottom 36 of light box 30 may also include a central bottom portion 42 extending rearward from the front panel 32. The front panel 32 is preferably bent in a rearward direction to form the bottom portion 42. The bottom central portion 42 may extend in a straight line from end to end of the front panel 32, or it may have a central portion that is offset toward the front, toward front panel 32, by lower offset 44. Advantageously, the central bottom portion 42 inclines slight upward, and the end portions 38 incline upward and inward toward a center plane of the vehicle.

The light box advantageously has a central top side 45a extending along the length of the front panel 32 and advantageously formed by bending the front panel 32 at an angle to form the central top side 45a. The top side also preferably includes a top side 45b on each end 34, again preferably formed by bending the end 34 at an angle to form the top side 45b. The top sides 45a, 45b are preferably bent at an angle suitable to allow a lower surface of the front bar 18 to abut the interior portion of the sides 45a, 45b when the light box 30 is fastened below the main frame 12. A bend of 90 degrees or greater is believed preferable. The top sides 45a, 45b are preferably relatively short and serve to stiffen the front panel 32 and ends 34. Advantageously, the front panel 32 and the ends 34 are made of a single sheet of metal with the ends 34 bent to align with the angle at which the ends 19b of front bar 18 are bent. The juncture of top sides 45a and 45b may be cut at the bend location with a "v" shaped cut to allow the top sides 19b to angle rearward with the ends 34, without buckling the metal strip forming the top sides as would occur if the top sides 19a, 19b were not cut.

Figure 5A:
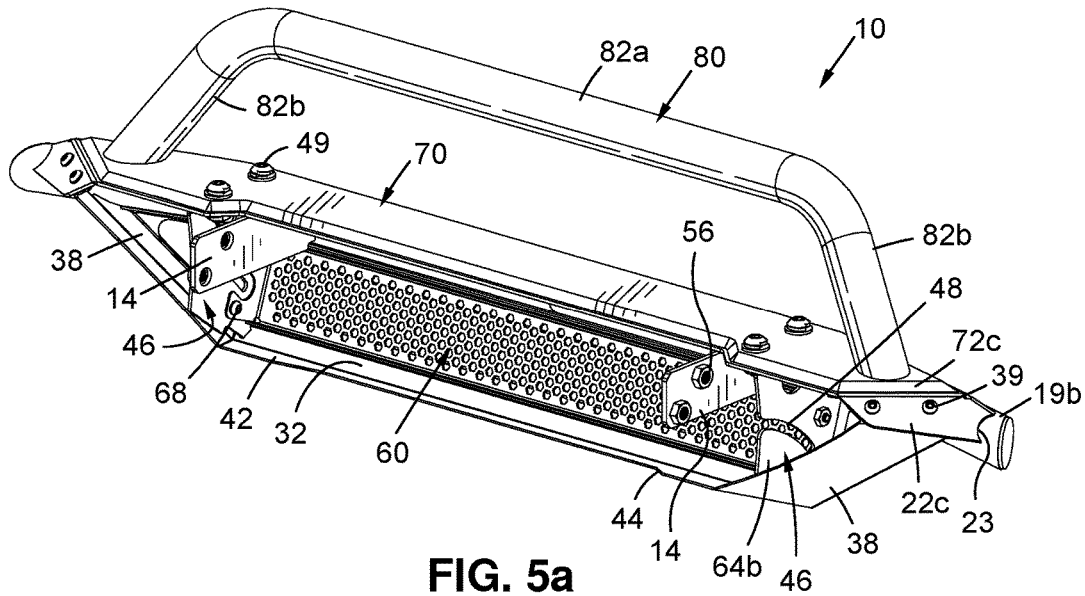
Figure 5B:
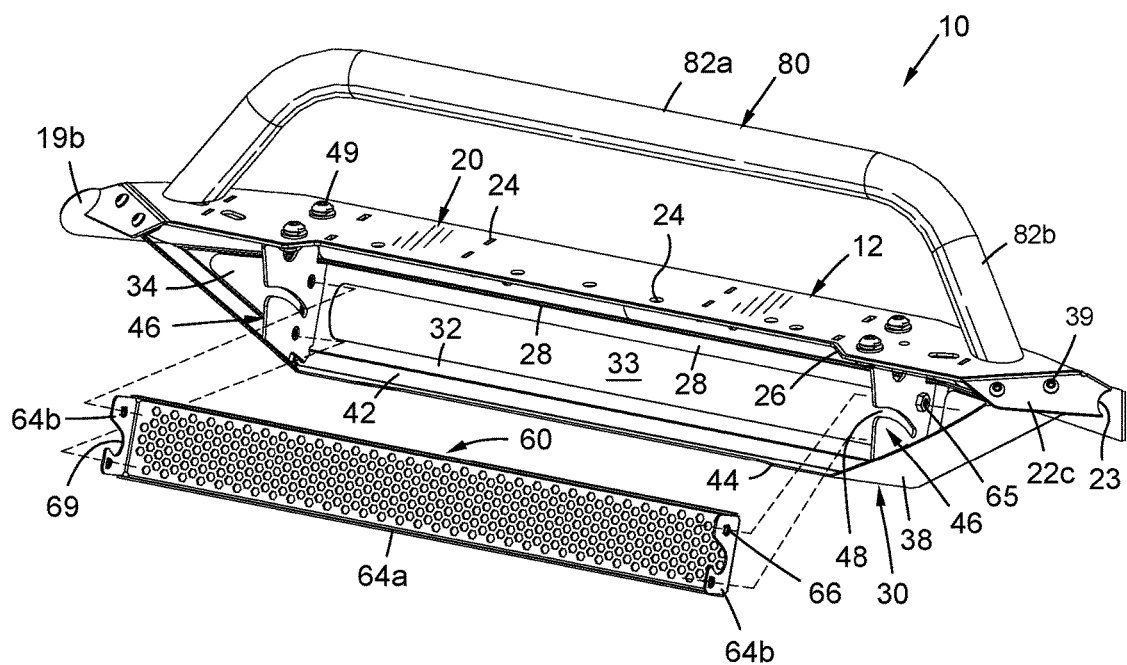
FIG. 5b is a rear perspective view of the light bar assembly of FIG. 3a, with the decorative panel separated therefrom.
Figure 6A:
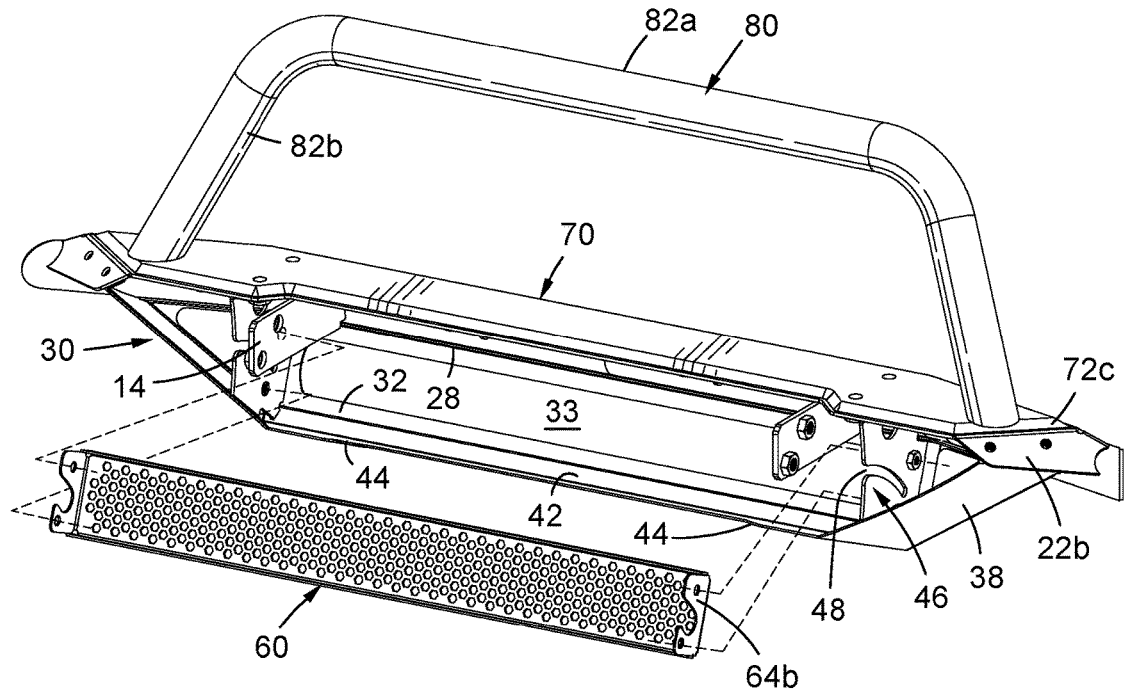
FIG. 6a is a rear perspective view of the light bar assembly of FIG. 3b.
Figure 6B:
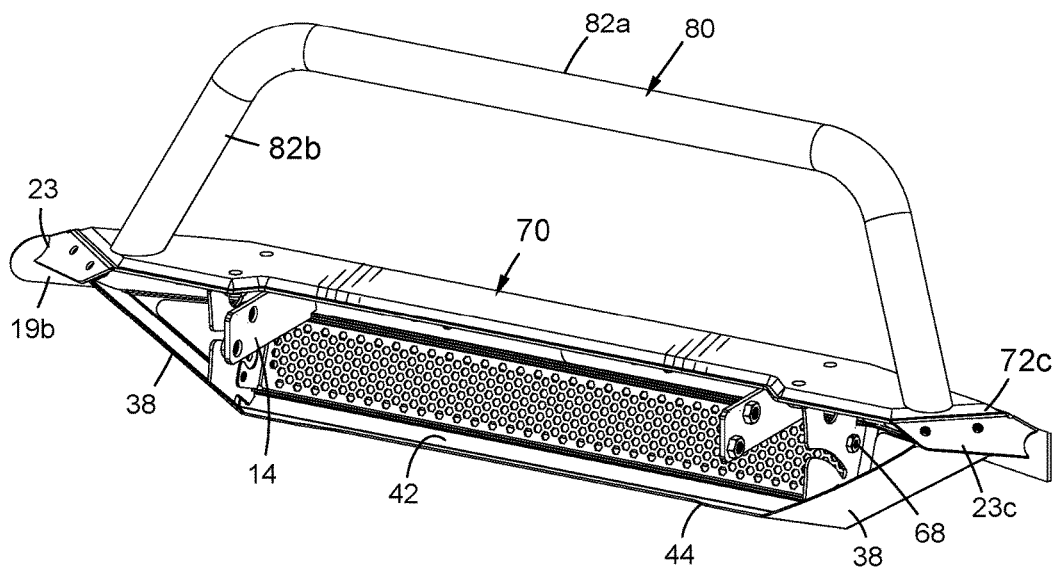
FIG. 6b is a rear perspective view of the light bar assembly of FIG. 3b, with the decorative panel separated therefrom.

As best seen in FIGS. 4 and 5a, 5b, a mounting bracket 46 having a slot 48 is connected to the inside of the light box 30. The mounting bracket 46 is shown as a vertical plate with a top flange 50 perpendicular to the plate. Threaded fasteners 49 pass through holes 24a, 24b in the mounting plate 20 and holes 52 in flange 50, to releasably connect those parts. The bracket 46 is preferably welded (but may be bolted) to the lower box 30, preferably along all edges of the bracket 46 that are immediately adjacent to or abutting the various parts of the light box described below, including one or more of the front panel 32, bottom portions 36, 38, 42, and 45. As best seen in FIGS. 5a, 5b, a front side of the bracket 56 is connected, preferably welded, to the back side of the front panel 32. The bracket 46 or flange 50 flange could be welded to the plate 20 and box 30, if the lower box 30 were not removable. As best see in FIG. 4, the holes 24a, 24b are oblong and oriented at right angles to each other, to accommodate misalignment of the holes 52 in the bracket 46. Advantageously, the holes 52 in the flange 50 of bracket 46 are threaded holes or have nuts fastened to the opposing face of the flange 50 to receive the fasteners 49. Each of the brackets 46 may have an access opening 54 located in the bracket and preferably extending to the flange 50, midway between the holes 52.

FIG. 5*a* shows the vehicle mounting members 14, which may have various shapes but are preferably flat plates welded or otherwise fastened to the underside of the mounting plate 20 and possibly to the rear side of the front member 18. The two vehicle mounting members 14 are both preferably located between the brackets 46, and preferably spaced far enough apart from the brackets 46 to allow access to bolt the vehicle mounting members to the motor vehicle. As seen in FIG. 5*a*, threaded nuts 56 may be welded or otherwise fastened to the vehicle mounting members 14 to allow bolting the vehicle mounting members 14 and main frame 12 to the vehicle 10. Advantageously, the main frame 12 is connected to the motor vehicle so the bottom of the light box rests against the top of the vehicle's front bumper, or is slightly above that bumper. Advantageously, the light box 30 and main frame 12 do not extend beyond the vertical plane of the front side of the front bumper.

As best seen in FIG. 5*b*, the slot 48 in each bracket 46 extends downwardly, extending from the rear side of the generally vertical plate forming the bracket 46, toward the opposing, front side of the plate. The slots 48 are aligned and preferably curve downward in an arc that begins at about the height of the top of the opening 33 and ends at about the middle of that opening in the front panel 32.

A decorative panel 60 covers the opening 33 in the front panel 32 and preferably fits inside the light box 30 and is fastened inside the light box by threaded fasteners or mechanical clips. The decorative panel 60 is thus preferably configured to extend over the entire opening 33 and also configured to releasably fasten to the light box 30. The decorative panel 60 is shown as comprising a generally rectangular front panel 62 with two opposing, long sides 64*a* bent perpendicular to the front panel 62 and two ends 64*b* also bent perpendicular to the front panel so the sides and ends form a box—like enclosure with an open back. The front panel 62 has a decorative pattern visible through opening 33. The depicted pattern is an open mesh that allows air to flow therethrough and preferably uses a series of hexagonal holes in the panel 62 to form a hexagonal mesh visible through the opening 62. Other decorative patterns may be used, including panels with circular, triangular and square holes, as examples. Decorative patterns which provide a visible surface texture, coloration or other decoration to the panel 60 that is visible through the opening 33, may be used.

The decorative panel 60 is removably connected to the light box various ways, preferably using threaded fasteners or clips that connect the sides 64*a* or ends 64*b* to the light box. In the depicted embodiment, the ends 64*b* of the decorative panel 60 have holes 66 through which threaded fasteners 68 pass to fasten the ends to the light box through holes in the mounting brackets 46 (FIGS. 5*a*-5*b*). The ends 64*b* are preferably parallel to and abut the sides of the mounting bracket 46 so the fasteners 68 pass through aligned holes in the bracket 46 and end 64. An access opening 69 is formed in each end 64*b* to allow access to the slot 48 and to prevent the end 64*b* from covering the slot. In the depicted embodiment, the access opening 69 is large enough to allow a nut and washer to be located along the length of the slot 48. The sides 64*a* and ends 64*b* stiffen the decorative panel 62 and reduce vibration. The sides 64*a* are preferably parallel to and abut the adjacent sides of the front panel 32. The various parts of the light box 30 are preferably made of metal, but a sufficiently strong and durable, high density polymer may be suitable.

Figure 2:
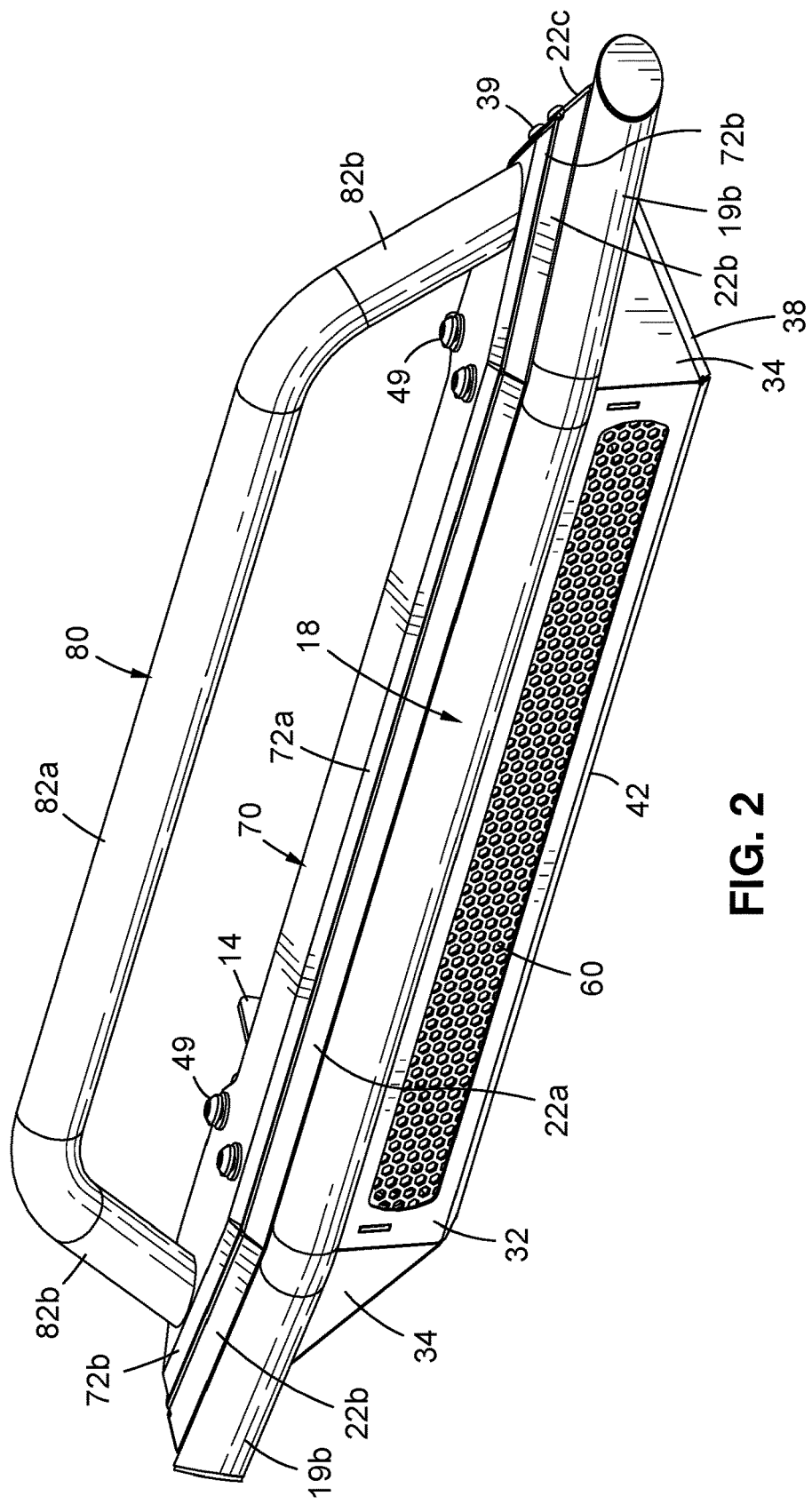
FIG. 2 is a front perspective view of the light bar assembly of FIG. 1 having a rider bar on a top cover plate on an upper portion of the light bar assembly and having a top cover plate on a light box on a lower portion of the light bar assembly.

Still referring to FIGS. 1-5*b*, a top cover plate 70 may optionally be fastened to the main panel 12. The top cover plate 70 advantageously has the same peripheral shape as the top, generally flat portion of the mounting plate 20 but has substantially no holes other than those holes 76 used for connecting the cover plate to the main frame to provide a more uniform and uninterrupted surface that is believed to be more aesthetically pleasing. The holes 76 are aligned to correspond with holes 24 in the underlying mounting plate 20 and in the depicted embodiment there are four holes for mounting the top cover plate to the mounting plate, with additional holes for the over rider bar 80. In the illustrated embodiment, the top cover plate 70 thus has a straight front side 72*a* and rearwardly inclined sides 72*b* on each opposing end of the top cover plate. The peripheral sides 72*a*, 72*b*, 72*c* are preferably angled from the horizontal plane at an angle the same as that of the sides 22*a*, 22*b* so the sides 22, 72 form a generally uniform (or stepped) inclined plane that is inclined toward a center of the respective parts 20, 70 (FIGS. 2-3). A rear side 72*c* inclines rearward from the outer end of each side 72*b*, and also extends inward toward the center plane of the vehicle so each pair of sides 72*b* and 72*c* form a V shape or arrowhead shape. The rear side of the top cover plate has a straight central portion generally parallel to the front central portion, and also parallel with straight end portions joining the inward ends of the sides 72*c* to the central portion at offset 74. The offset 74 is above offset 26 during use.

As best seen in FIG. 4, threaded fasteners 49 preferably extend through holes 76 in the top cover plate 70 that are aligned with holes 24*a*, 24*b* in the mounting plate 20, to releasably connect the top cover plate 70 to the main frame 12. The same fasteners 49 preferably fasten the mounting brackets 46 of the light box 30 to the main frame when the light box is used.

An over rider bar 80 is optionally fastened to the main frame 12 and optionally to the top cover plate 70. The over rider bar 80 preferably comprises a metal tube having a central portion 82*a* that is generally straight and parallel to the central portion 19*a* of the front bar 18. The over rider bar 80 has two opposing ends 82*b* of the same length that extend downward toward and connect to the main frame 12. Advantageously, the ends 82*b* have a straight, outwardly inclined portion that abuts the top cover plate 70 at an angle forming an elliptical interface on each end 82*b*. Each end 82*b* preferably curves downward from the central portion 82*a* although a sharp angle could be used. Threaded fasteners 84 extend through aligned holes 24*c* in the mounting plate 20 and holes 86 (FIG. 4) in top cover plate 70 and into mating threads in each corresponding end 82*b* to releasably fasten the over rider bar 80 to the main frame 12. The threaded fasteners 84 may also pass through holes in the top cover plate 70 when it is present so the fasteners not only connect the over rider bar 80 to the main frame 12, but also connect the top cover plate 70 to the main frame 12. A threaded stud, extending downward from each distal end 82*b* to engage a nut below the main frame 12 could also be used. The fasteners 49 can also removably fasten the light box 30 to the main frame 12 when the box is used. The over rider bar 80 is preferably in a plane generally perpendicular to the mounting plate 20, and the mounting plate 20 is preferably horizontal when mounted to a vehicle setting on flat ground. Advantageously, the over rider bar 80 does not extend above the hood of the motor vehicle 16 (FIG. 1) and preferably the over rider bar extends only above any lights present on the main frame to protect the lights and reduce the obstruction of the vehicle's grill.

The main frame 12 provides the base for several different configurations and lighting supports. The decorative panel 60 may be removed and various lights mounted to the light box 30 to shine through the opening 33 and provide illumination to the area in front of the motor vehicle. The front panel 32 and light box 30 enclose the top, bottom, sides and parts of the front of the lights to provide protection from damage by debris, foliage and various objects on the ground. The front bar 18 extends in front of the front panel 32 of the light box and serves to absorb the primary impact of heavier undergrowth, shrubs, trees etc. The downwardly and rearwardly inclination on the front panel 32 helps deflect shrubs and other undergrowth over the panel 32 to shield the more fragile lights in the light box shining through the opening 32. The relatively small vertical height of the opening 32 (preferably about 1 to about 4 inches) and more preferably about 1-2 inches) helps reduce the exposure of the lights to damage.

The light box 30 may be removed from the main frame 12 by use of the threaded fasteners 49 which releasably connect the mounting brackets 46 to the main frame. Various lights may also be mounted below the over rider bar 80 bar as discussed later, and the over rider bar may be of variable height. Replacement and even the entire removal of the over rider bar is readily achieved through the two fasteners 84 that releasably connect the ends of the bar 80 to the main frame 12. The four fasteners 49 also allow removal of the top cover plate 70 to provide ready access to the various holes 24 and other mounting openings in the mounting plate 20, when the fasteners for the over rider 80 are removed. The four fasteners 49 may have rounded tops to provide a more pleasing or smoother appearance. For a more simplified and aesthetic appearance, the top cover plate 70 may cover the various holes and openings in the mounting plate 20, with the over rider bar being removeable as well. Thus, as few as six threaded fasteners may connect the top cover plate 20 to the main frame 12, with four of those fasteners being visible when the over rider bar 80 is fastened to the main frame 12. The over rider bar 80 is desirable as it provides a barrier extending across the grill and helps deflect heavy undergrowth, trees, plants etc. from damaging the vehicle and from damaging lights located between the bar 80 and main frame 12.

Referring to FIGS. 3*a*, 3*b*, 5*a* to 6*b*, 9-10 and 14, the over rider bar 80 may be of various heights "h" with the figures showing the center portion 82*a* at a shorter height h1 and at a taller height h2. The shorter height h2 (FIG. 3*a*) is preferably around 4-6 inches to accommodate mounted lights 90 about 3 inches in diameter, preferably held in brackets 92 that are releasably fastened to the mounting plate 20 (FIG. 11). Such lighting brackets 92 are commonly connected by threaded fasteners to the mounting plate, but other connections can be used. The brackets 92 typically have a base with holes for threaded fasteners to connect the base to the support. The lights or a housing for the lights often have a trunnion extending from opposing sides so that opposing sides of the bracket hold the trunnion to allow the light to be adjustable positioned about the trunnion axis in a vertical plane. The lighting brackets may allow rotation of the light about the vertical axis. Various lighting brackets 92 are available and may be used with the main frame 12 and its mounting plate 20. The lights 90 are preferably LED lights, and more preferably either three inch or six inch lights. The elongated light 90 is preferably a 20 inch, single row, LED light bar.

Figure 11:
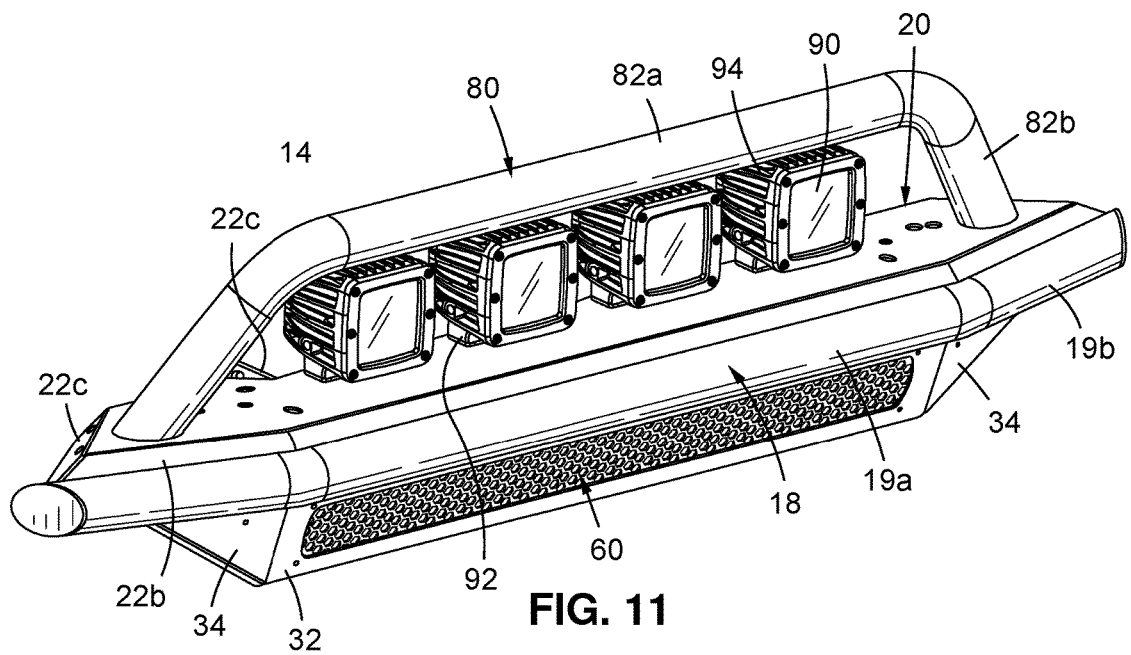
FIG. 11 is a front perspective view of the light bar assembly of FIG. 3a with four lights on an upper portion of the light bar assembly and no top cover plate on the light bar assembly.
Figure 12:
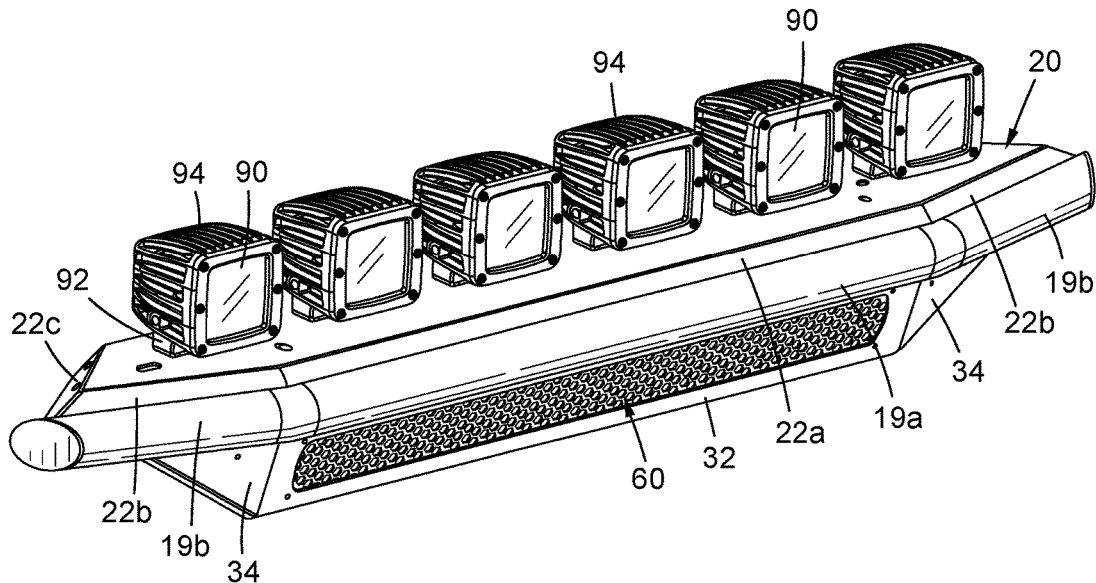
FIG. 12 is a front perspective view of the light bar assembly of FIG. 11 with no rider bar and six lights on an upper portion of the light bar assembly.
Figure 13:
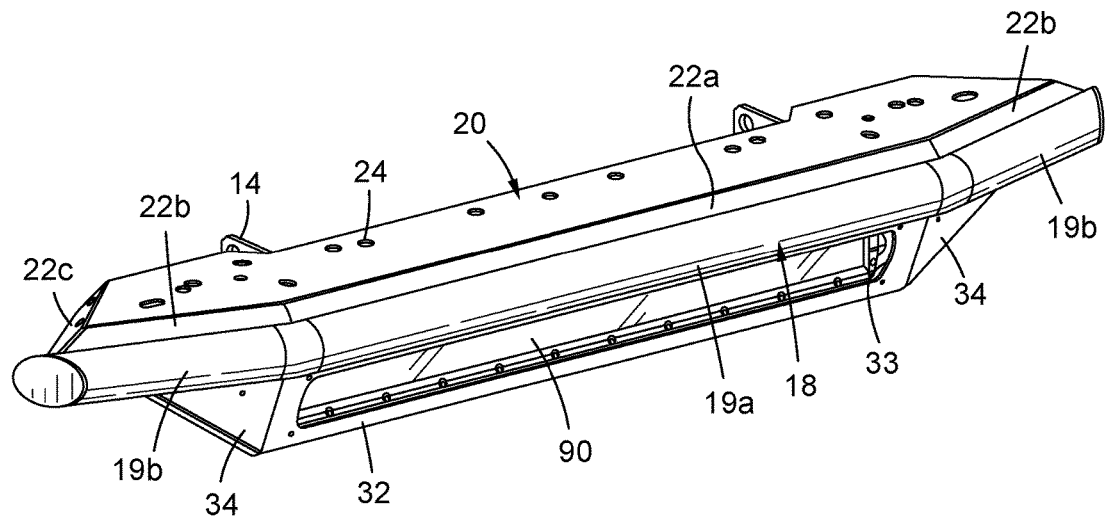
FIG. 13 is a front perspective view of the light bar assembly of FIG. 7 with no rider bar and no top cover plate.
Figure 14:
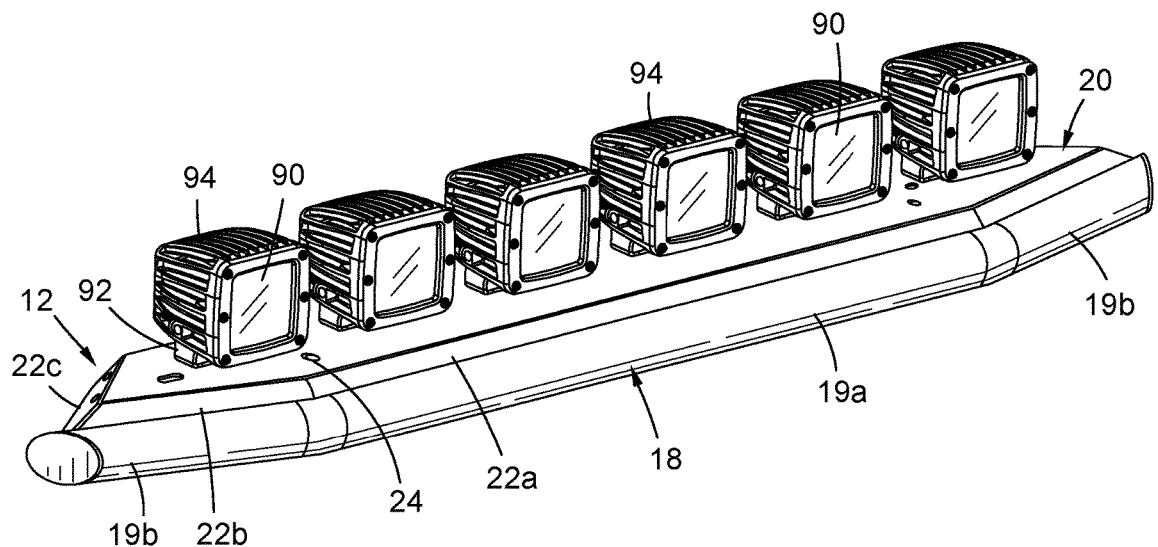
FIG. 14 is a front perspective view of the light bar assembly of FIG. 13 having six lights thereon and no light box and no elongated light.

The lighting brackets 92 are preferably releasably connected to the main frame 12 using threaded fasteners, but other connections can be used. As seen in FIG. 13, the mounting plate 20 may advantageously have a plurality of holes 24 in the plate at predetermined locations to accept standard bolt patterns for various lighting brackets 92. For example, referring to FIG. 10, if three larger lights are envisioned then preferably three sets of at least two (and preferably three or four) fastener holes may be provided for each light 90 or more likely, for the bracket 29 holding the light—with one set for each light. The fastener holes 24 are preferably symmetrically located below the center portion of the over rider bar 80. The fastener holes 24 are preferably located to allow for orientation of the lights in the brackets if the brackets allow rotation of the lights along horizontal or vertical axes without hitting the grill or the over rider bar 80. Likewise, referring to FIGS. 11 and 12, the mounting plate 20 may have predetermined fastener holes 24 for a plurality of smaller lights, with the number of fastener holes accommodating fewer lights 90 if the over rider bar 80 is used (FIG. 11) and a larger number of fastener holes to accommodate a larger number of lights 90 and brackets 92 if the over rider bar 80 is not used (FIG. 12). But the number and location of mounting holes 24 for each light bracket 92 may vary as some brackets have positioning slots in the bracket that allow the bracket (and hence the light) to be positioned relative to a bolt that fastens the bracket to the mounting plate 20. The hole pattern as depicted in FIG. 4 and the other Figures is believed advantageous for three larger or four smaller lights as described herein, but other hole patterns or arrangements may be used.

Figure 10:
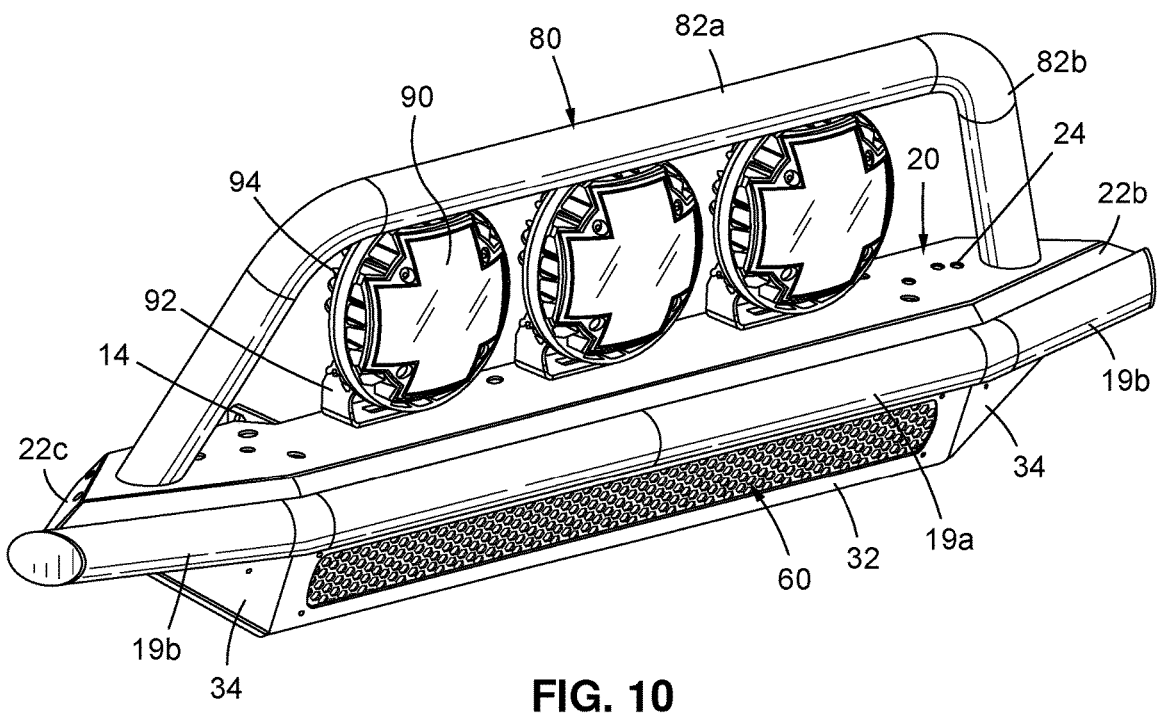
FIG. 10 is a front perspective view of the light bar assembly of FIG. 3b with three lights on an upper portion of the light bar assembly and below the rider bar and no top cover plate on the light bar assembly.

The greater height h2 (FIG. 3*b*) is preferably about 7-10 inches to accommodate mounting lights 90 about 6 inches in diameter (FIG. 10). The smaller lights 90 allow more lights to be used, while the larger lights allow fewer lights to be used. The exact distances between the bottom of the over rider bar 80 and the main support 12 will vary depending on the height of the lights 90 when installed in their mounting brackets 92, the motor vehicle design, and other design considerations.

Figure 7:
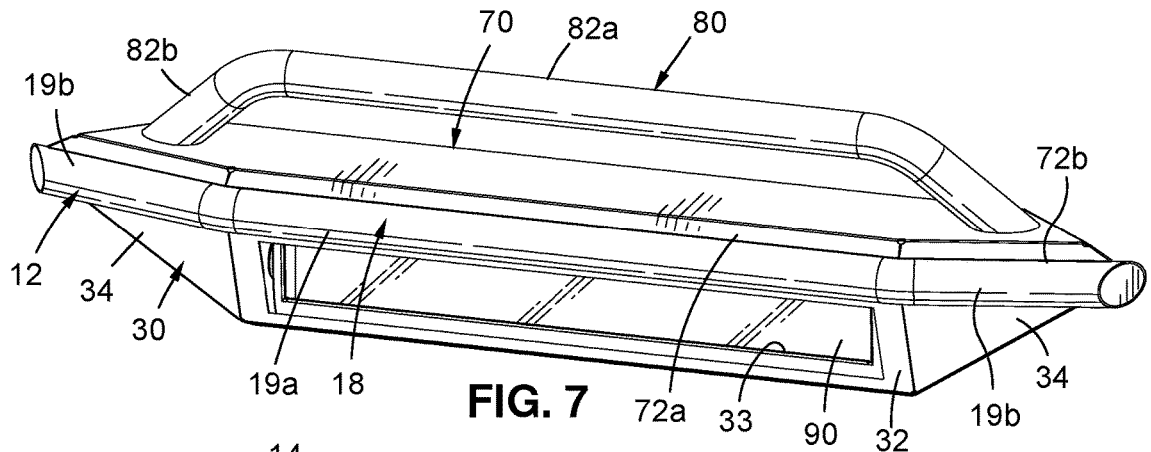
FIG. 7 is a front perspective view of the light bar assembly of FIG. 2 with an elongated light in the light box on the lower portion of the light bar assembly and the rider bar on an upper portion of the light bar assembly.
Figure 8A:
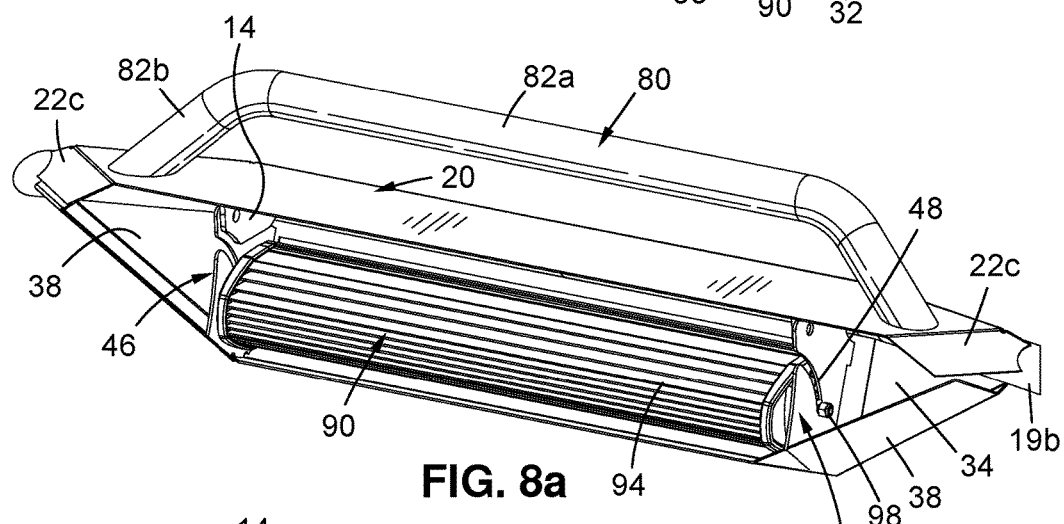
FIG. 8a is a rear perspective view of the light bar assembly of FIG. 7 with parts of the vehicle mounting members broken away.
Figure 8B:
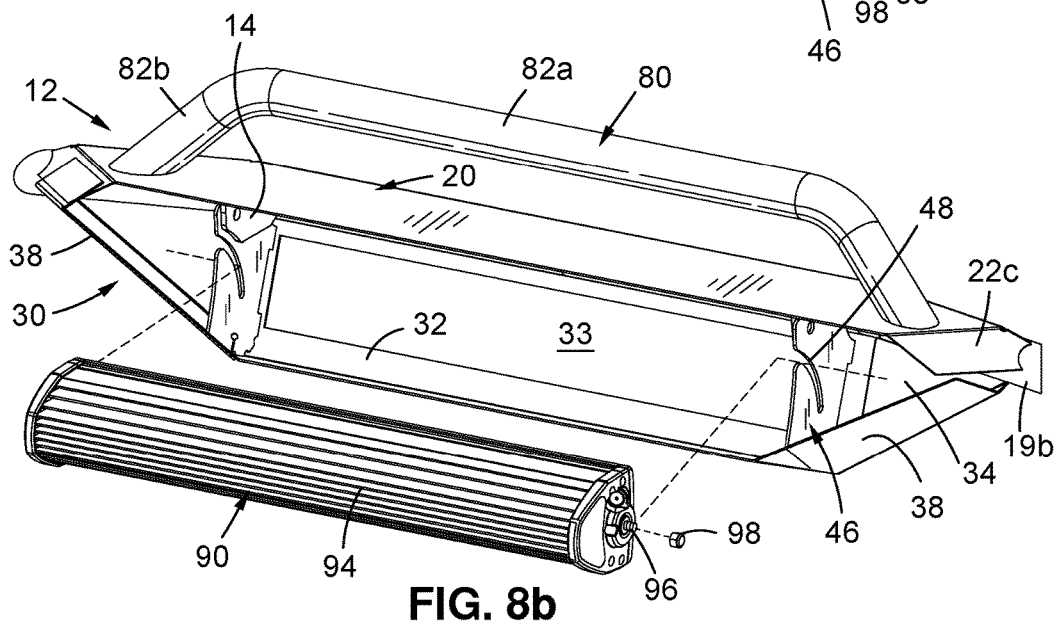
FIG. 8b is a rear perspective view of the light bar assembly of FIG. 7 with the elongated light separated therefrom and with parts of the vehicle mounting members broken away.

The elongated opening 33 in the front panel 32 is well suited to use of a single, elongated light 90 as shown in FIG. 7-8*b* and the same elongated type of light can be fastened to the mounting plate 20 below the over rider bar 80 (FIG. 9) preferably using the shorter height over rider bar. Referring to FIGS. 5*a*-8*b*, the elongated light 90 may be mounted to the light box 30 by first removing the decorative panel 60, if present, by removing the threaded fasteners engaging the threaded nuts 56 to hold the ends 64*b* to the respective mounting brackets 56. After the panel 60 is removed the elongated light is inserted into position. The elongated light 90 is in a housing 94 having trunnion 96 (FIG. 8*b*) extending from each end along a longitudinal axis of the elongated light. Each trunnion is placed into one of the slots 48 in a different one of the mounting brackets 46. The slots 48 guide the trunnion 96 and the elongated light into position relative to the opening 33 and front panel 32. Advantageously, each slot 48 is curved or angled to allow the light 90 to fit into its use position. The front panel 32 is inclined the bottom 42, 44 of the light box is also inclined and that makes it difficult to fit the light 90 into position. The vehicle mounting members 14 also may interfere with the elongated light installation or replacement if the main frame 12 and light box 30 are connected to the motor vehicle. The slot 48 guides the trunnion 96 and light 90 into position relative to the opening 33. Advantageously, the slot 48 ends with the light in the correct position, or it may allow positioning with a clamping nut 98 tightened to hold the housing 94 and light in position. Advantageously, the configuration of the housing 94 and the orientation of the bottom 42, 44 of the light box help position the elongated light 90 in the correct position and orientation. Rotation about the trunnion axis may adjust the position and/or orientation of the light. The elongated light 90 may be removed by reversing the process, and replacing the decorative panel 60 in the light box 30.

Figure 9:
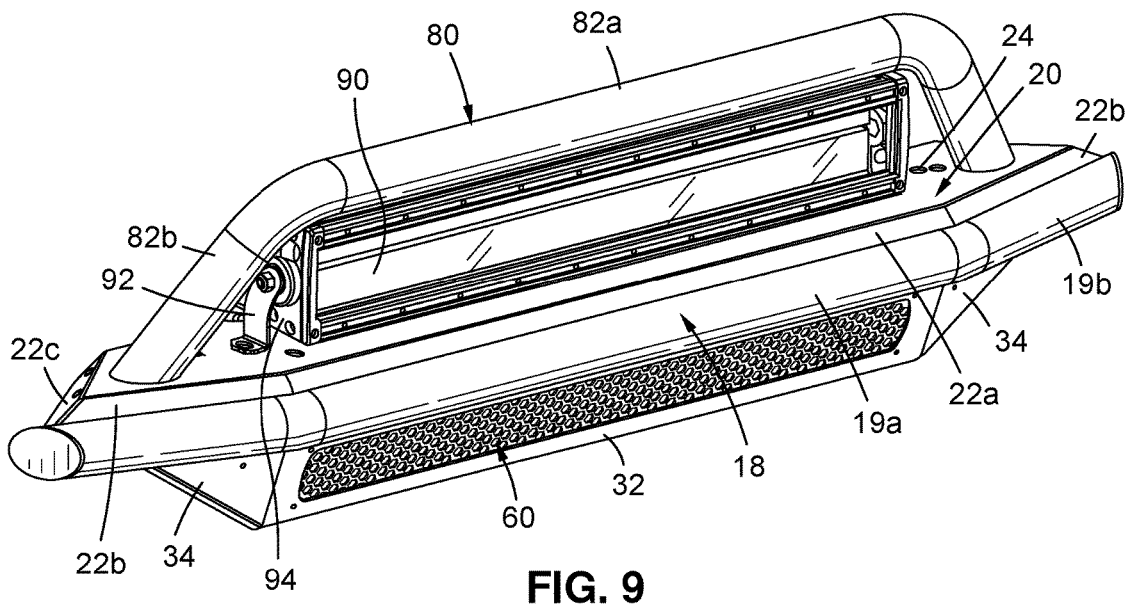
FIG. 9 is a front perspective view of the light bar assembly of FIG. 2 with an elongated light on an upper portion of the light bar assembly and below the rider bar and no top cover plate on the light bar assembly.

As seen in FIG. 9, an elongated light 90 may be placed below the over rider bar 80, with a lighting bracket 92 connecting the trunnion 96 to the bracket to allow adjustment of the light along the vertical axis. The elongated light 90 may be used with (FIG. 7) or without (FIG. 9) an elongated light in the light box 30. If no light is mounted above the main frame 12 and below the over rider bar 80 (FIG. 7) then advantageously the top cover plate 70 is releasably fastened to the mounting plate 20 of the main frame 12. If lights are mounted above the main frame 12 then the top cover 70 is removed so the various fastener holes 24 are available to connect the various lighting brackets 92 to the mounting plate 20 and the main frame 12.

The main frame 12 thus provides a base from which a variety of configurations may be achieved. The main frame 12 may be used with (FIGS. 7-11) or without (FIGS. 12, 14) an over rider bar 80. That allows lights at a higher elevation that available with the lower location of the light box 30. The light box 30 may be attached to the main frame 12 but have no light in it (FIGS. 9-12) or it may be attached and have a light in it (FIG. 7). The light box provides a low angle of illumination much closer to the level of the road or ground on which the vehicle travels, while the lights above the mounting frame provide a higher angle of illumination (but still much lower than a light mounted on top of the vehicle cab). The front member 18 on the main frame 12 cooperates with the front panel 32 and light box 30 to deflect undergrowth and trees downward, below the vehicle and away from any light in the light box. The front member 18 on the main frame 12 cooperates with the over rider bar 80 to deflect undergrowth and trees away from the grill and the vehicle's hood and away from any lights between the over rider bar 80 and the main frame 12. The top cover plate 70 provides an aesthetically pleasing upper, visible surface when no lights are attached to the main frame 12 above the main frame. The decorative panel 60 provides an aesthetically pleasing cover for the light opening 33 when no light is provided in the light box—while allowing such a light to be readily installed as desired by the user. The main frame 12 and associated optional parts thus allows a user to create a variety of lighting arrangements to suit the user's particular desires.

The present light bar apparatus allows great flexibility by using a few removable connections that are preferably threaded fasteners. The over rider bar 80 may be removed from the main frame 12 by unscrewing a threaded fastener 84 at each of two locations, one at each end of the over rider bar 80. The light box 30, if present, allows easy access to the threaded fasteners 84 for easy removal, or installation if the bar 80 is being added. The top cover plate 70 may be used to aesthetically cover the mounting plate 20 and its numerous fastener holes 24. Four threaded fasteners 49 hold the plate 70 to the main frame 12 and mounting plate 20. The same four threaded fasteners 49 along with the threaded fasteners 39 (FIG. 4) can hold the mounting brackets 46 and light box 30 to the mounting frame 12. Thus, ten threaded fasteners 39, 46, 84 removably connect the three main components (bar 80, plate 70, box 30) to the main frame 12.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of releasably fastening various parts to the main frame 12, including mounting the lights and lighting brackets to the main frame 12 and to the light box 30, and of mounting the light box and over rider bar 80 to the main frame. Further, the various features of this invention can be used alone, or in varying combinations with each other and are not intended to be limited to the specific combination described herein. Thus, the invention is not to be limited by the illustrated embodiments.

What is claimed is:

1. A front light bar assembly for the front of a motor vehicle having a front bumper and front grill, comprising
   a main frame comprising a front tubular member and a mounting plate permanently fastened to an upper portion of the front tubular member, the front tubular member extending across a majority of a width of the front grill and having two opposing ends inclined toward a rear of the vehicle, the mounting plate having a plurality of fastener holes extending therethrough;
   two vehicle mounting members connected to the main frame and having a rearward end configured to releasably connect to the motor vehicle, each vehicle mounting member extending in a rearward direction a distance sufficient to connect to the motor vehicle and position the main frame above the front bumper and in front of the front grill;
   a light box releasably fastened to and extending below the main frame, the light box having a front panel with an elongated opening over 12 inches long and over one inch high and having a mounting bracket on each opposing end of the elongated opening for mounting one end of a light bar, the light box having a height short enough that the front panel fits between the main frame and the front bumper;
   wherein the light box further comprises two opposing end panels connected to the front panel and extending in a downward and rearward direction, with a bottom edge on each end panel that inclines upward toward a bottom of the main frame;
   wherein the light box is connected to the bottom of the mounting plate by four bolts on each side of the mounting plate, with two of those four bolts connecting one of the mounting brackets to the mounting plate, and the remaining two of those four bolts connecting one of the end panels to the mounting plate.

2. The light bar apparatus of claim 1, wherein the elongated opening has a decorative panel covering the opening and removably connected to the light box.

3. The light bar apparatus of claim 2, wherein the decorative panel comprises an open mesh.

4. The light bar apparatus of claim 1, wherein a light bar is connected to the mounting brackets of the light box and is aligned with the elongated opening to shine through that elongated opening during use.

5. The light bar apparatus of claim 4, further comprising a top cover plate releasably connected to the main frame and covering the fasteners holes in the mounting plate.

6. The light bar apparatus of claim 1, further comprising an over rider bar removably connected to the main frame and having a middle portion vertically above the main frame by a distance h, with two opposing end portions of the same length that extend downward to connect to the main frame.

7. The light bar of claim 6 wherein each end portion of the over rider bar is removably connected to the mounting plate by a threaded fastener passing through one of the plurality of holes in the mounting plate.

8. The light bar of claim 6 wherein the distance h is between about 4 to about 6 inches.

9. The light bar of claim 6 wherein the distance h is between about 7 inches to about 10 inches.

10. The light bar of claim 6 wherein the distance h is between about 4 to about 6 inches and a plurality of separate lights are connected to the mounting plate using a plurality of the fastener holes.

11. The light bar of claim 6 wherein the distance h is between about 7 inches to about 10 inches and a plurality of separate lights are connected to the mounting plate using a plurality of the fastener holes.

12. The light bar of claim 6 wherein the distance h is between about 3 inches to 6 inches and a single light bar is connected to the mounting plate using a plurality of the fastener holes.

13. The light bar of claim 6 wherein a plurality of lights are releasably connected to the mounting plate.

14. The light bar of claim 1 wherein the mounting plate has an inclined side along at least a front periphery of the mounting plate, with the side inclined forward and downward and fastened to a top portion of the front tubular member so the mounting plate is located above the top of the front tubular member.

* * * * *